United States Patent [19]
Mueller

[11] 3,820,042

[45] June 25, 1974

[54] FAST START-UP SYSTEM FOR AUTOMATIC TRANSVERSAL EQUALIZERS

[75] Inventor: Kurt Hugo Mueller, Kuesnacht, Switzerland

[73] Assignee: Bell Telephone Laboratories, Incorporated, Murray Hill, N.J.

[22] Filed: May 3, 1973

[21] Appl. No.: 356,957

[52] U.S. Cl. .................................... 333/18, 325/42
[51] Int. Cl. .............................................. H04b 3/04
[58] Field of Search .................. 333/18; 325/42, 65; 328/167

[56] References Cited

UNITED STATES PATENTS 3,697,897 10/1972 Chang .................................. 333/18
3,715,666 2/1973 Mueller et al. .................. 333/18 X

*Primary Examiner*—Paul L. Gensler
*Attorney, Agent, or Firm*—J. P. Kearns

[57] ABSTRACT

Method and apparatus for rapid initial setting in synchronous data transmission systems of transversal equalizer tap coefficients employ a weighting matrix in the tap-gain adjustment control loop, but not in any path which includes the signal being equalized. The values of the matrix elements are predetermined in accordance with the transmission characteristics of the distorting transmission medium and the type of signal processing employed. The effect is to reduce the settling or convergence time for initial equalizer training to two or three adjustments even in partial-response signaling systems.

9 Claims, 5 Drawing Figures

FAST START-UP SYSTEM FOR AUTOMATIC TRANSVERSAL EQUALIZERS

FIELD OF THE INVENTION

This invention relates to synchronous digital data transmission systems and in particular to the rapid equalization of distorting transmission channels for partial-response signaling systems.

BACKGROUND OF THE INVENTION

U.S. Pat. No. 3,697,897 issued to R. W. Chang on Oct. 10, 1972 and entitled "Fast Start-Up System for Automatic Transversal Equalizers" describes an arrangement for making the tap signals in transversal equalizers mutually orthogonal in order to minimize the correlation therebetween and thereby promote rapid initial convergence of the equalizer. This arrangement is particularly advantageous for high-speed data transmission over band-limited channels utilizing partial-response signaling techniques. By this technique data impulses are transmitted at a serial baud rate exceeding the reciprocal of the available bandwidth. At such transmission rates the response of the transmission channel to each impulse does not subside within its own signaling interval. Each data impulse not only produces a major response component in its own baud interval but also significant components in neighboring baud intervals. The resultant interference is predictable, however, and by appropriate precoding manipulations the desired signal can be recovered at a receiving terminal from single samples. Due to the patterned nature of the partial-response signaling format dispersed over two or more signaling intervals a high degree of correlation exists among successive signal samples. This correlation tends to cause an extended settling time in automatic equalizers for such signals, becuase tap-gain coefficient corrections are not independent of each other.

According to the teachings of the cited Chang patent, the inherent correlation among successive partial-response signals is compensated by transforming received signal components into a set of orthonormal components in a weighting matrix positioned between the equalizer taps and the tap-gain attenuators. The elements of the weighting matrix are determined by the amplitude characteristic of the transmission channel and the signaling format.

It has been found in practice that the requirement of having the signals to be equalized traverse the decorrelating matrix leads to undesirable complexities in initial presetting of the equalizer and in constraining the range of the variable gain coefficients to make them compatible with the fixed gain of the matrix elements.

It is an object of this invention to obtain fast start-up characteristics in an automatic transversal equalizer for highly correlated signaling formats while avoiding the disadvantages of prior arrangements.

It is another object of this invention to modify the automatic transversal equalizer to minimize settling time without altering the through-transmission path for signals to be equalized.

It is a further object of this invention to reduce the error minimization procedure in an automatic transversal equalizer for a partial-response data transmission system as nearly as possible to a single adjustment.

SUMMARY OF THE INVENTION

The above and other objects of this invention are attained by applying the inverse of a matrix derived from the autocorrelation of all the signals appearing at the taps of a transversal equalizer solely for the purpose of computing tap-gain increments adaptive to minimize the output error without having the matrix operate on the equalized signals delivered to the output of the equalizer. The selectively attenuated tap signals that are combined to form the equalized output of the transversal structure do not traverse the matrix, as in the prior art, and thus are not affected by any lack of precision in implementing the matrix elements. Furthermore, initial zeroing or restoration of the tap gains to a predetermined reference state is not constrained in any way by the presence of the matrix.

In one embodiment of the invention the decorrelation matrix is placed between correlators of error and tap signals and the tap-gain attenuators.

In another embodiment of the invention the decorrelation matrix is placed between the correlators of error and tap signals and the taps of the transversal structure.

It is a feature of this invention that the forward signal path for highly correlated signals to be equalized is independent of the decorrelating control circuits. Thus, the basic transversal structure is available for operating on correlated or uncorrelated signals without any other change than bypassing the matrix.

It is another feature of this invention that the elements of the decorrelation matrix are real rational numbers (which can be scaled to become integers) for partial response signaling formats.

DESCRIPTION OF THE DRAWING

The foregoing and other objects and features of this invention will become apparent from the following detailed description when read in conjunction with the accompanying drawing in which.

DETAILED DESCRIPTION

Figures 1, 4, 5:
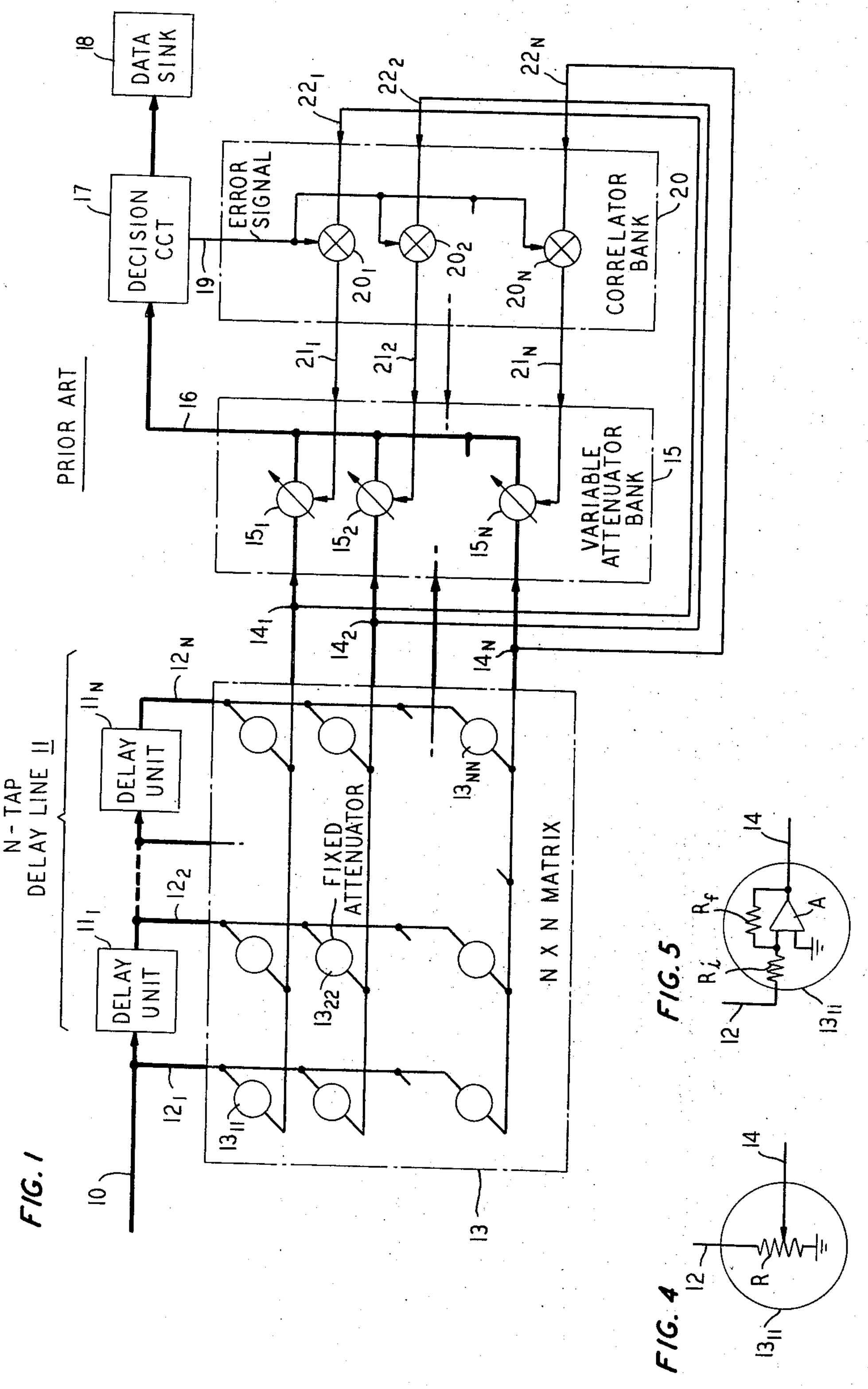
FIG. 1 is a block diagram of an automatic transversal equalizer of the prior art modified to process correlated data signals of the partial-response type.
FIG. 4 is a schematic diagram of an adjustable resistive divider useful in the practice of this invention.
FIG. 5 is a schematic diagram of an operational amplifier useful in the practice of this invention.

FIG. 1 is a simplified block schematic diagram of an automatic transversal equalizer modified according to the teachings of the cited Chang patent to process highly correlated digital data signals of the partial-response type. Partial-response signals result from the transmission of impulses through bandlimited channels at a rate equal to not less than twice the available bandwidth. Such signals yield responses whose nonzero components extend to neighboring signaling intervals. By careful control of the resultant intersymbol interference which increases the number of levels in the baseband data eye pattern, transmitted data signals can be reconstructed from single samples of received signals. The interrelations among nonzero components for a particular class of partial-response are fixed except for additional distortion introduced by a nonideal channel. Consequently, there exists a fixed and persistent correlation with respect to relative polarities among consecutive samples of partial-response signals. This correlation causes disadvantageously extended settling times in transversal equalizers being adjusted in accordance with algorithms strictly applicable to uncorrelated signal formats only.

The prior-art arrangement shown in FIG. 1 comprises a delay line 11 including delay units $11_1$ through $11_N$ together with taps $12_1$, $12_2$ through $12_N$ and an input line 10; a variable attenuator bank 15 including variable gain devices $15_1$, $15_2$ through $15_N$; a correlator bank 20 including multiplying devices $20_1$, $20_2$ through $20_N$; decision circuit 17 and data sink 18. So much of the prior-art arrangement as just described acts to equalize uncorrelated signals by correlating an error signal over lead 19, derived in decision circuit 17 from a comparison of a summed equalized output signal on lead 16 with a built-in desired signal, with each tap signal to generate the several tap-gain adjustment signals on leads 21. The N designation refers to the number of taps in the delay line.

In order to handle correlated received signals matrix 13 comprises N×N fixed attenuators or weighting devices connected at the crosspoints of the rows and columns thereof respectively by vertical circuit paths to individual taps 12 and by horizontal circuit paths to individual variable attenuators 15. Thus, each variable attenuator receives a weighted summation of tap-signal components in such a way that the overall inputs to devices 15 are orthogonalized or decorrelated.

The signal paths for the received signals from line 10 to be equalized extend over the bold lines through orthogonalizing matrix 13, thereby creating critical adjustment round-off error and presetting problems. Furthermore, the calculation of the element values in the orthogonalization matrix is more complicated than is actually necessary.

As has been explained in the cited Chang application, distortion minimization in a transversal equalizer is a convex function of the tap attenuator gain coefficients, i.e., convergence can be guaranteed by performing an iterative process. The gradient of the error $e$ with respect to each tap-gain coefficient $c_i$ is the partial derivative $$\delta e/\delta c_i \qquad (1)$$

Designating the correlation matrix of all the cross-products of the signals appearing at the taps 12 of the delay line 11 in FIG. 1 as A (Capital letters are used hereinafter to represent matrices and lower-case letters, to represent column vectors.) and the column vector representing the cross-products of the actual tap signals with the desired equalizer output signal as $v$, the error gradient becomes (as expressed in Chang's equation (13))

$$\delta e/\delta c = 2Ac - 2v \qquad (2)$$

The error $e$ is minimized when $\delta e/\delta c_i = 0$ for all tap-gain coefficients $c_i$ simultaneously or when the column vector $c$ representing the tap attenuators is selected according to $$Ac = v \qquad (3)$$

It is readily seen from equation (3) that the optimum coefficient vector $c$ occurs when $$c_{opt} = A^{-1}v \qquad (4)$$

A generalized iterative algorithm for finding the optimum coefficient vector $c_{opt}$ can be expressed as $$c_{m+1} = c_m - Q_m g_m \qquad (5)$$

where $c_m$ and $c_{m+1}$ = respectively the present and next tap-gain coefficient vectors,
$Q_m$ = a decorrelation matrix, and
$g_m$ = gradient vector $\delta e/\delta c$.

Equations (4) and (5) can be combined to form $$c_{m+1} = I\, c_m - Q_m(Ac_m - v)$$
$$= (I - Q_m A)c_m + Q_m v \qquad (6)$$

where I = the identity matrix having 1's in the left-to-right diagonal and 0's at all other positions.

Introducing the difference between the desired tap-gain coefficient $c_m$ and the optimum coefficient $c_{opt}$ as the tap error vector $$\phi_m = c_m - c_{opt} \qquad (7)$$

equations (4), (5), (6) and (7) can be combined as $$\phi_{m+1} = (I - Q_m A)\,\phi_m \qquad (8)$$

We can choose the decorrelation matrix $Q_m$ to be equal to the inverse of the ideal partial-response signal correlation matrix $A_0$ on the assumption that the amplitude response of the typical voice-grade telephone channel is essentially flat and constant. Chang has been able to demonstrate that the correlation matrix is independent of the phase response of the channel, as well as the system timing and the phase of the demodulating carrier wave.

Letting $Q_m = A_0^{-1}$, the matrix $Q_m A = A_0^{-1}A$ in equation (8) will be close to the identity matrix I and the change in tap-gain becomes a function of the negligible difference between the identity matrix and the product of the actual tap-signal correlation matrix A and the inverse of the ideal correlation matrix $A_0$.

chang has shown in columns 7 and 8 of his specification that the ideal correlation matrix for the Class IV partial-response signal is of the form $$A_0^{IV} = \begin{bmatrix} 1 & 0 & -1/2 & 0 & \cdots & 0 \\ 0 & 1 & 0 & -1/2 & \cdots & 0 \\ -1/2 & 0 & 1 & 0 & \cdots & 0 \\ 0 & -1/2 & 0 & 1 & \cdots & 0 \\ \vdots & \vdots & \vdots & \vdots & & \vdots \\ 0 & 0 & 0 & 0 & \cdots & 1 \end{bmatrix} \qquad (9)$$

By similar reasoning it can be shown that the ideal Class I partial-response correlation matrix is of the form $$A_0^I = \begin{bmatrix} 1 & 1/2 & 0 & \dots & 0 \\ 1/2 & 1 & 1/2 & \dots & 0 \\ 0 & 1/2 & 1 & \dots & 0 \\ \cdot & \cdot & \cdot & & \cdot \\ \cdot & \cdot & \cdot & \dots & \cdot \\ \cdot & \cdot & \cdot & & \cdot \\ 0 & 0 & 0 & \dots & 1 \end{bmatrix} \qquad (10)$$

Reference is here made to U.S. Pat. No. 3,388,330 issued to E. R. Kretzmer on June 11, 1968 for descriptions of the several classes of partial-response signals. Specifically, the Class I partial-response format results in two equal-valued nonzero response components of like polarity in adjacent signaling intervals and exhibits no excess bandwidth at the upper cutoff frequency. The Class IV partial-response format results in two equal-valued nonzero response components of opposite polarity in alternate signaling intervals and exhibits zero excess bandwidth at both upper and lower cutoff frequencies.

Standard manipulations of matrices, are expounded in Chapter 3 of F. M. Stein's *Introduction to Matrices and Determinants* (Wadsworth Publishing Company, Incorporated, Belmont, Calif., 1967), can be applied to equations (9) and (10) to obtain their inverses.

Figure 2:
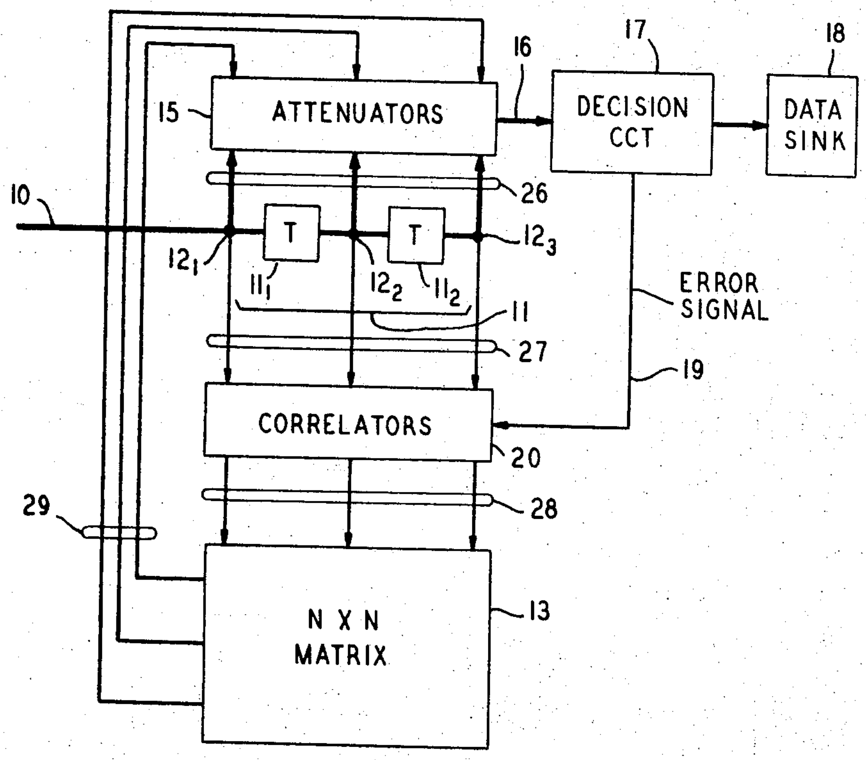
FIG. 2 is a block diagram of an automatic equalizer modified according to this invention to process partial-response data signals by placing a decorrelation matrix between the correlators and the tap-gain attenuators.
Figure 3:
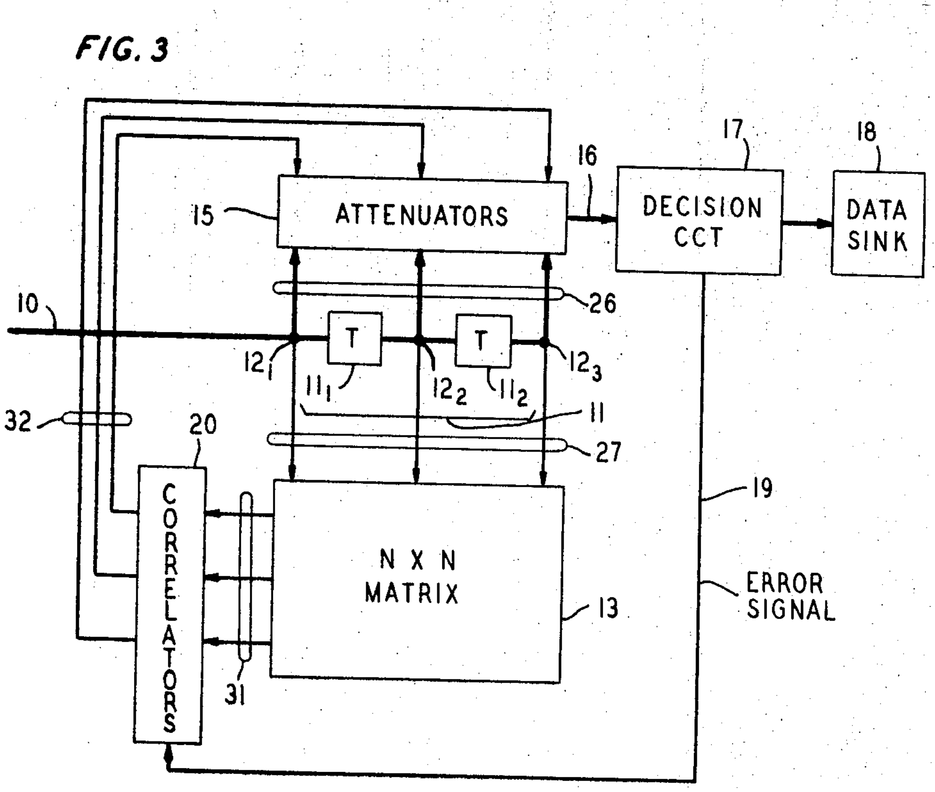
FIG. 3 is a block diagram of another embodiment of an automatic transversal equalizer modified according to this invention to process partial-response data signals by placing a decorrelation matrix between the equalizer tap outputs and the correlators.

Thus, the inverse of the Class IV partial-response matrix of order 3 corresponding to the three-tap equalizers of FIGS. 2 and 3 becomes $$[A_0^{IV}]^{-1} = \begin{bmatrix} 4/3 & 0 & 2/3 \\ 0 & 1 & 0 \\ 2/3 & 0 & 4/3 \end{bmatrix} \qquad (11)$$

Similarly, the inverse of the Class I partial-response matrix of order 3 becomes $$[A_0^I]^{-1} = \begin{bmatrix} 3/2 & -1 & 1/2 \\ -1 & 2 & -1 \\ 1/2 & -1 & 3/2 \end{bmatrix} \qquad (12)$$

Corresponding matrices for higher order transversal equalizers can be obtained by following well-known mathematical procedures for the inverse transformation of matrices. Where Chang's orthogonalization matrix P required a computer-implemented additional transformation in accordance with his equation (21) after obtaining the inverse transformation of the ideal signal correlation matrix A of his equation (20), the present invention requires only the inverse transformation.

FIGS. 2 and 3 are block schematic diagrams of alternative illustrative embodiments of an automatic transversal equalizer with tap-gain control loops decorrelated for received signals encoded in a format, such as that called partial-response, in which a high degree of correlation exists among neighboring signal samples. The same designators are used in each of FIGS. 2 and 3 wherever common functions are being performed.

The automatic equalizer of FIG. 2 comprises input line 10; delay line 11 with T-second delay units $\mathbf{11_1}$ and $\mathbf{11_2}$ and taps $\mathbf{12_1}$, $\mathbf{12_2}$ and $\mathbf{12_3}$; attenuators 15 and correlators 20 connected directly to taps 12; decision circuit 17 connected over lead 16 to the summed outputs of attenuators 15 and providing an error signal to correlators 20 over lead 19; data sink 18 connected to receive detected data from decision circuit 17; and N × N decorrelating matrix 13 connected over leads 28 and 29 between the outputs of correlators 20 to the control inputs of attenuators 15. Delay line 11, which can advantageously have as many taps N as required, attenuators 15, correlators 20, decision circuit 17 and data sink 18 are substantially equivalent to the identically designated blocks in FIG. 1 where internal attenuator and correlator devices are shown. Matrices 13 in FIGS. 1 and 2 are similar structurally, but the values of the fixed attenuator elements are different. The matrix elements in FIG. 1 are those of Chang's P orthogonalization matrix defined in his equation (22). The matrix elements of FIG. 2 are those of the inverse $A_0$ matrix of the type defined by my equations (11) or (12), specifically for respective Class IV and Class I partial-response formats.

The elements of the decorrelation matrix can be multiplied by any convenient value to suit particular implementation needs. For example, the elements can be scaled so as to become integers for convenient binary representation. In other cases, the scaling may be done in such a way that the largest element coincides with the largest possible binary number in the available storage space. In analog implementations with a resistive summing arrangement, a passive circuit would constrain the maximum element value to unity. This can easily be achieved; in the example of matrix (11) a scaling factor of ¾ yields diagonal elements 1, ¾, 1 and the corner elements become ½.

The crosspoint elements of the decorrelation matrix, moreover, need not be physically implemented in the form of lumped resistors. Where the signals applied to the equalizer have been encoded as binary numbers, the matrix elements can be implemented as binary multipliers controlled by factors encoded as binary digits stored in a read-only memory. Different read-only memories can be prepared in advance to be applied whenever the signal format is changed or the transmission characteristics of the channel vary with time in a drastic manner. In this regard it may be noted that a representative telephone voice channel exhibits a pronounced parabolic delay-frequency characteristic. The matrix can readily be designed to compensate in a compromise fashion for this often-encountered characteristic.

Beyond this the matrix can be applied in a more general way as a signal processor for implementing the cyclical equalizer disclosed in U.S. Pat. No. 3,715,666 issued on Feb. 6, 1973 to D. A. Spaulding and myself.

FIG. 4 is exemplary of a passive resistive divider useful in the practice of this invention at the crosspoints of the decorrelation matrix shown in either of FIGS. 2 or 3. The circle $13_{11}$ represents any of the crosspoints between horizontal and vertical conductors with square matrix 13. Input lead 12 is a vertical conductor from a delay line tap. Output lead 14 is a horizontal conductor in circuit with the variable attenuator bank. Resistor R is a resistive divider in the form of an adjustable potentiometer having one fixed terminal connected to input lead 12 grounded in conventional fashion and a movable armature connected to output lead 14.

FIG. 5 is a schematic diagram of an alternative embodiment of a crosspoint element for the decorrelation matrix shown in FIGS. 2 and 3. Within representative crosspoint circle $13_{11}$ operational amplifier A includes one grounded noninverting input as indicated, an inverting input connected through input resistor $R_i$ to tap input lead 12, an output lead 14 from the output thereof and a feedback resistor $R_f$ interconnecting the output and inverting input thereof. The transfer ratio between input and output is determined, as is well known, solely by the ratio of feedback resistor $R_f$ to input resistor $R_i$. Such operational amplifiers are readily available in compact integrated-circuit form.

As the bold leads 10, 26 and 16 indicate, the equalized signal path is independent of the decorrelating matrix 13. Accordingly, any lack of precision in setting the matrix elements affects only an incremental adjustment of an attenuator, but does not affect the equalized signal directly. Furthermore, any initializing signals supplied to the attenuators need not compensate for the presence of the decorrelating matrix, as in Chang's invention.

The transversal equalizer of FIG. 3 differs from that shown in FIG. 2 in having decorrelation matrix 13 connected between taps 12 on delay line 11 over leads 27 and the input to correlators 20 over leads 31. Taps 12 are connected directly to attenuators 15 as in FIG. 2, however. The outputs of correlators 20 are connected directly to the control inputs of attenuators 15 over leads 32. Matrix 13 responds to equations (11) and (12) in the same way as that in FIG. 2, i.e., the elements of this matrix are those of the inverse signal correlation matrix $A_0$. Since the several operations performed in the control loop between the delay line taps and the tap attenuators occur in series, the arrangements of FIGS. 2 and 3 are substantial equivalents. All components which are functionally equivalent bear the same designators.

While this invention has been described in terms of specific illustrative embodiments, its application is not limited to the equalization of the particular classes of highly correlated signals described but one skilled in the art to which it relates can readily extend its principle to other highly correlated signal formats or to channels whose amplitude response is other than flat.

What is claimed is:

1. In combination with a receiver for a synchronous data transmission system in which attenuators connected to taps on a transversal equalizer are adjusted by correlating actual received signals with an output error difference signal, means for establishing tap attenuator settings rapidly comprising matrix means including a square array of weighting devices located at crosspoints of rows and columns thereof, and a plurality of correlators tandemly connected with said matrix means between said taps and said attenuators, said correlators being individually operative on unequalized signals at particular taps and as a group responsive to said error signal for determining tap-gain control signals for said attenuators.

2. The combination according to claim 1 in which said matrix is connected between said plurality of correlators and said attenuators, and said correlators are connected directly to said taps.

3. The combination according to claim 1 in which said matrix is connected between said taps and said plurality of correlators and said correlators are connected between said matrix and said attenuators.

4. The combination according to claim 1 in which said matrix is a square matrix having as many rows and as many columns as there are taps on said transversal equalizer.

5. The combination according to claim 1 in which the crosspoint elements of said matrix means are resistive dividers.

6. The combination according to claim 1 in which the crosspoint elements of said matrix means are operational amplifiers whose feedback and input resistors are selected in accordance with the transmission characteristics of a distorting transmission medium and a particular signaling format to decorrelate substantially a sequence of received signals appearing at said equalizer taps.

7. The combination according to claim 1 in which the amplitude characteristic of the distorting transmission medium is substantially flat with frequency over the desired transmission bandwidth and the signaling format results for each input impulse in two equal non-zero response components of the same polarity in adjacent signalling intervals such as to be defined by a square matrix having as many rows and columns as taps on said equalizer of the form $$A_0 = \begin{bmatrix} 1 & 1/2 & 0 & \cdots & 0 \\ 1/2 & 1 & 1/2 & \cdots & 0 \\ 0 & 1/2 & 1 & \cdots & 0 \\ \cdot & \cdot & \cdot & & \cdot \\ \cdot & \cdot & \cdot & \cdots & \cdot \\ \cdot & \cdot & \cdot & & \cdot \\ 0 & 0 & 0 & \cdots & 1 \end{bmatrix}, \quad \text{and}$$

the weighting means located at the cross-points of said matrix for decorrelating received signals are defined in their output-to-input transfer ratios by the elements of the inverse of said $A_0$ matrix.

8. The combination according to claim 1 in which the amplitude characteristic of the distorting transmission medium is substantially flat with frequency over the desired transmission bandwidth and the signaling format results for each input impulse in two equal non-zero response components of opposite polarity in alternate signaling intervals such as to be defined by a square matrix having as many rows and columns as taps on said equalizer of the form $$A_0 = \begin{bmatrix} 1 & 0 & -1/2 & 0 & \dots & 0 \\ 0 & 1 & 0 & -1/2 & \dots & 0 \\ -1/2 & 0 & 1 & 0 & \dots & 0 \\ 0 & -1/2 & 0 & 1 & \dots & 0 \\ \cdot & \cdot & \cdot & \cdot & \cdot & \cdot \\ \cdot & \cdot & \cdot & \cdot & \cdot & \cdot \\ \cdot & \cdot & \cdot & \cdot & \cdot & \cdot \\ 0 & 0 & 0 & 0 & \dots & 1 \end{bmatrix}, \text{ and}$$

the weighting means located at the cross-points of said matrix for decorrelating received signals are defined in their output-to-input transfer ratios by the elements of the inverse of said $A_0$ matrix.

9. In an automatic transversal equalizer for a synchronous partial-response data transmission system in which there is a high degree of correlation among successive signals, a tapped delay line with a tap spacing equal to the reciprocal of the synchronous symbol rate, a plurality of variable attenuators connected to said taps, means for adjusting said attenuators in accordance with the error difference between a summation of delayed components of an impulse signal applied to said equalizer after weighting by said attenuators and a predetermined reference signal, and means for minimizing the number of adjustments for achieving equalizer convergence comprising an array of weighting means and, a plurality of correlators tandemly connected with said array in a control loop between the taps of said delay line and said attenuators for correlating said error difference with signal samples at said taps, the values of the crosspoint transfer ratios of said weighting means at the crosspoints of said array being determined by the inverse of a matrix defining the correlation among the response components of the partial-response signal format being transmitted.

* * * * *